United States Patent [19]

Morris et al.

[11] Patent Number: 4,503,287
[45] Date of Patent: Mar. 5, 1985

[54] TWO-TIERED COMMUNICATION SECURITY EMPLOYING ASYMMETRIC SESSION KEYS

[75] Inventors: C. Carson Morris, Broad Run; Barry H. Bielsker, Vienna, both of Va.; Donald A. Cole, Rockville, Md.

[73] Assignee: Analytics, Inc., Willow Grove, Pa.

[21] Appl. No.: 323,931

[22] Filed: Nov. 23, 1981

[51] Int. Cl.³ ............................................. H04L 9/02
[52] U.S. Cl. ............................... 178/22.08; 178/22 B; 178/22.14; 375/2.1
[58] Field of Search ............... 178/22.09, 22.13, 22.14, 178/22.15, 22.19, 22.08; 375/2.1

[56] References Cited

U.S. PATENT DOCUMENTS

| | | | |
|---|---|---|---|
| 3,566,362 | 2/1971 | Taylor | 340/172.5 |
| 3,764,742 | 10/1973 | Abbott et al. | 178/22.08 |
| 3,798,359 | 3/1974 | Feistel | 178/22.08 |
| 3,806,882 | 4/1974 | Clarke | 340/172.5 |
| 3,956,615 | 5/1976 | Anderson et al. | 178/22.08 |
| 3,962,539 | 6/1976 | Ehrsam et al. | 178/22.09 |
| 3,984,637 | 10/1976 | Caudill et al. | 179/2 |
| 4,087,856 | 5/1978 | Attanasio | 364/200 |
| 4,157,454 | 6/1979 | Becker | 178/22.12 |
| 4,168,396 | 9/1979 | Best | 178/22.09 |
| 4,218,582 | 8/1980 | Hellman et al. | 178/22.11 |
| 4,218,738 | 8/1980 | Matyas et al. | 178/22.08 |
| 4,227,253 | 10/1980 | Ehrsam et al. | 375/2 |
| 4,238,853 | 12/1980 | Ehrsam et al. | 375/2 |
| 4,238,854 | 12/1980 | Ehrsam et al. | 178/22.16 |
| 4,393,269 | 7/1983 | Konheim et al. | 178/22.08 |

Primary Examiner—Sal Cangialosi
Attorney, Agent, or Firm—Woodcock Washburn Kurtz Mackiewicz & Norris

[57] ABSTRACT

Communications security between a host computer and another remote computer or terminal is ensured by a means of a two-tiered cryptographic communications security device and procedure. A master key is used to encrypt a first session key. The session key encrypted under the master key is transmitted from a remote facility to a host computer. At the host computer, the session key is decrypted and stored, a second and different session key is then generated, encrypted under the master key and transmitted to the remote facility where it is utilized as the facilities session decryptor key. Because the session key utilized for transmission of data between the remote facility and the host differs from the session key utilized for transmission of data between the host and the remote facility, communications security is increased.

12 Claims, 5 Drawing Figures

TWO-TIERED COMMUNICATION SECURITY EMPLOYING ASYMMETRIC SESSION KEYS

BACKGROUND OF THE INVENTION

The present invention relates in general to a cryptographic communication security device and process utilized for the transmission of data for example, between a host computer and either another computer or an associated data input terminal or device. In particular, the present invention relates to such a method and device which employs asymmetric session keys.

With the increasing use of communications between remote terminals and centralized host computers or between hosts over insecure communication lines, the need for computer data security has become acute. Cryptography has been utilized as an effective data security measure on an increasing scale to solve this problem. Thus, cryptography has been utilized, as an example, to frustrate attempts to divert cash, checks, negotiable instruments and other sensitive data being transmitted between a terminal and a host along insecure communications links. In U.S. Pat. Nos. 4,238,853 and 4,227,253—Ehrsam et al, two-tiered cryptographic communications security devices and procedures are employed in a single domain and multiple domain networks. A two-tiered cryptographic communications security device or procedure is one which employs two distinct categories of cipher keys, namely an operational or data encrypting key, sometimes referred to as a session key, and a key encrypting key, sometimes referred to as a master key.

In the device and process disclosed in U.S. Pat. No. 4,238,853 by Ehrsam et al, master keys known to both terminal and host are utilized to encrypt an operational or session key. The session key, encrypted under a master key, is then transmitted from terminal to host or from host to terminal for use in encrypting data during a particular transmission session. Thus, a session key is a time variant key which is dynamically generated for each communication session and which is used to protect communicated data. Thus, in the system disclosed by Ehrsam et al, the same session key is utilized for encrypting data during a given communication session regardless of whether data is passing from terminal to host or from host to terminal during a given communication session.

One difficulty, however, encountered with the Ehrsam et al device and process is that since the session key utilized to encrypt data passing between terminal and host, is the same session key which is utilized to transmit data from host to terminal during a given communications session, a breach of security as to the session key is fatal. Thus, the Ehrsam et al system is based upon the assumption that it will take an unauthorized party an impractically long time to ascertain a given session key during a particular communication session. While this assumption may be largely correct, there are instances when difficulties may arise.

For example, where a long series of data is transmitted from a terminal to a host representing, just as an example, check balances for deposit, it might be possible for an unauthorized party to break the session key utilized in transmitting that data given a sufficient period of time. Knowing that session key, the unauthorized party might then direct an unauthentic confirmation signal from the host to the terminal and thus divert the transmitted check balances to an improper bank account. Thus, even though the duration of an authentic confirmation signal directed from the host to the terminal might be too short to permit derivation of the session key during its transmission, because the session key utilized for the transmission of data from the terminal to the host is the same session key, security may be breached.

It would be desirable to further increase the likelihood that a given session key could not be derived by unauthorized parties. The present invention meets this objective in a manner which will be further described below.

SUMMARY OF THE INVENTION

The present invention solves the foregoing problem by the provision of asymmetric session keys. Thus, in the telecommunication link encryptor/decryptor of the present invention, a means for storing a session encryptor key and a means for storing a session decryptor key are provided at both ends of a telecommunications link, for example at a terminal and host. The session encryptor key utilized by the terminal differs from the session encryptor key used by the host. In this manner, a breach of security with respect to the terminal session encryptor key will not breach security with respect to the host session encryptor key.

In accordance with another important aspect of the present invention, the terminal and host operate in a master/slave relationship with respect to the generation of session keys. Thus, in accordance with the method of the present invention, upon receipt by the host of the session encryptor key being utilized by the terminal (which session encryptor key is encrypted under the master key), the host automatically generates a host session encryptor key which differs from that utilized by the terminal. This automatically generated session encryptor key is then encrypted under the master key and transmitted to the terminal for use as the terminal's session decryptor key.

BRIEF DESCRIPTION OF THE DRAWINGS

The present invention will be more fully understood by reference to the accompanying drawings, in which.

DETAILED DESCRIPTION OF THE PREFERRED EMBODIMENT

Figure 1:
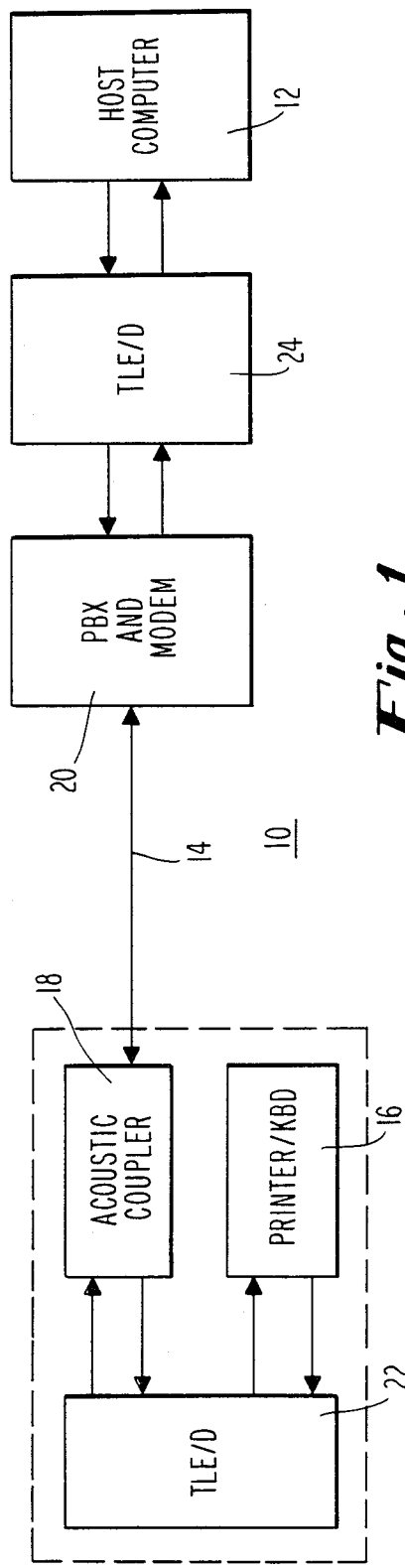
FIG. 1 is a block diagram illustrating the data communication network employing telecommunication link encryptor/decryptors of the present invention.

Referring first to FIG. 1, a telecommunications network is shown generally at 10. The telecommunications network generally includes a host computer shown at 12. The host computer is interconnected by means of a telecommunications link 14 to a remote facility at which is located either a data terminal shown generally at 16 or alternatively another computer (not shown). The data terminal 16 may include a printer and a keyboard and is utilized to input data to the host computer 12 across the telecommunications link 14 or to output data from the host which has been transmitted across the link 14. Where the telecommunication link 14 employs standard telephone lines, the terminal 16 may include, an interface with those lines, such as an acoustic coupler shown at 18. The interface between the telecommunications link 14 and the host computer 12 is generally provided by means of a PBX and modem shown generally at 20.

Cryptographic security is provided in accordance with the present invention, by the provision of telecommunication link encryptor/decryptors located at each extreme of the telecommunications link 14, for the embodiment shown in FIG. 1. A first telecommunication link encryptor/decryptor 22 is connected between the terminal 16 and the telecommunication link 14. Moreover, a second telecommunication link encryptor/decryptor 24 is connected at the opposite extreme of the link 14 between the link and the host computer 12.

The telecommunication link encryptor/decryptors 22, 24 provide the benefit of two-tiered cryptographic security but, in accordance with the present invention provide the additional security of asymmetric session keys as will be described below in connection with FIG. 2.

Figure 2:
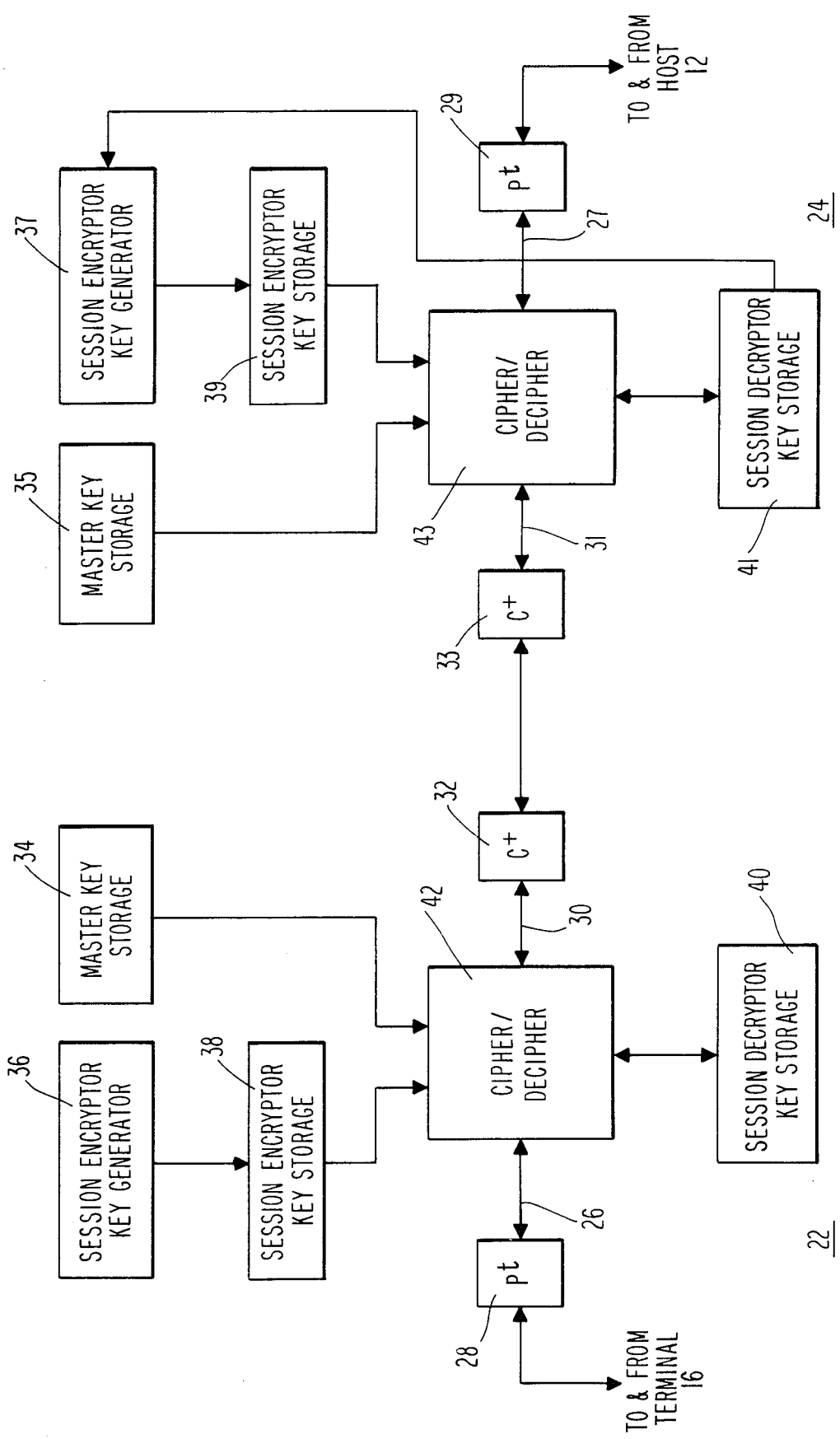
FIG. 2 is a more detailed block diagram of one such telecommunication link encryptor/decryptor.

Referring now to FIG. 2, the two telecommunication link encryptor/decryptors 22 and 24, will be described in detail. In accordance with the present invention, the telecommunication link encryptors/decryptors 22 and 24 each include a first line 26, 27 to whch plain text 28, 29 is directed from the terminal 16 in the case of encryptor/decryptor 22 and from the host 12 in the case of encryptor/decryptor 24. Each encryptor/decryptor 22, 24 further includes a second line 30, 31 over which ciphered text 32, 33 is directed to the telecommunications link 14 through appropriate interface means. Each telecommunication link encryptor/decryptor 22 and 24 further comprises a first means 34, 35 for storing a master key. The master key is, for example, a 64-bit binary number which is randomly generated and is the same number for both terminal and host. The telecommunication link encryptor/decryptor 22 and 24 each further include a session encryptor key generator 36, 37 which will be further described in connection with FIG. 3 below.

Telecommunication link encryptors/decryptors 22, 24 also include a storage means 38, 39 which are used to store a session encryptor key, the session encryptor keys being generated by the session encryptor key generators 36, 37, respectively. The session encryptor keys stored in the storage means 38, 39 always differ from one another in accordance with the present invention. The telecommunications link encryptors/decryptors 22 and 24 also each include an additional storage means 40, 41 for storing a session decryptor key and each also include a cipher means 42, 43. The cipher means 42 and 43 are interconnected between first and second lines 26, 27 and 30, 31, respectively. The cipher means 42 at encryptor/decryptor 22 is responsive to the first means 34 for storing a master key and to the second means 38 for storing the terminal session encryptor key and also to the third storage means 40 for storing the terminal session decryptor key. The cipher means 43 at the host is responsive to a fourth storage means 35 for storing a master key, to a fifth storage means 39 for storing a host session encryptor key and to a sixth storage means 41 for storing a host session decryptor key. Each of the cipher means 42, 43 may read the appropriate key stored in the storage means 34, 38, 40 and 35, 39, 41 respectively so as to encipher plain text and decipher ciphered text as needed.

In accordance with the preferred embodiment of the present invention, each of the cipher means 42, 43 either encrypt or decrypt data according to algorithms set forth and described in U.S. Pat. Nos. 3,796,830; 3,798,369 and 3,958,081, the algorithms of which have been adopted by the National Bureau of Standards as the data encryption standard (DES) algorithm and which are described in detail in the Federal Information Processing Standards Publication, Jan. 15, 1977, FIPS PUB. 46.

Further in accordance with the most important aspects of the present invention, the session encryptor key stored in the session encryptor key storage means 38 at the encryptor/decryptor 22 differs from the session encryptor key stored in the session encryptor key storage means 39 at the encryptor/decryptor 24. Thus, when it is desired to transmit plain text data 28 from the terminal 16 to the host 12, for example, the session encryptor key generator 36 is activated to generate a terminal session encryptor key for the terminal 16 which is stored in the terminal's session encryptor key storage means 38. This terminal session encryptor key is preferably a 64-bit binary number which is generated in accordance with the procedure outlined below. The terminal session encryptor key stored in storage means 38 is thereafter encrypted under the master key stored in master key storage means 34 at the cipher means 42 and the terminal session encryptor key which is encrypted under the master key is thereafter transmitted as cipher text 32 to the telecommunication link encryptor/decryptor 24 at the host 12 across the telecommunication link 14.

At the host encryptor/decryptor 24, the terminal session encryptor key is received as cipher text 33 and is deciphered under the master key by cipher means 43 and stored in the host's session decryptor key storage means 41.

In accordance with another important aspect of the present invention, the host's session encryptor key generator 37 is responsive to the host's session decryptor key storage means 41 such that upon receipt and storage of the host's session decryptor key at the storage means 41, the session encryptor key generator 37 is automatically activated. In this manner, upon receipt of a session key from the terminal, the host automatically generates a different session key for transmission from the host to the terminal. This automatically generated session key is then directed to the host's session encryptor key storage means 39 and enciphered at the cipher means 43 under the master key for transmission to the terminal where it is stored in the terminal's session decryptor key storage means 40.

After asymmetric session keys have been exchanged in this manner, plain text data 28 may be directed from the terminal 16 along first line 26 to the cipher means 42 wherein it is encrypted under the terminal session encryptor key and transferred through the second line 30 as cipher text 32 across the transmission link 14 to the cipher means 43. At the cipher means 43 the enciphered data is deciphered under the host session decryptor key stored in session decryptor key storage means 41 and output as plain text data 29 to the host 12.

Figure 3:
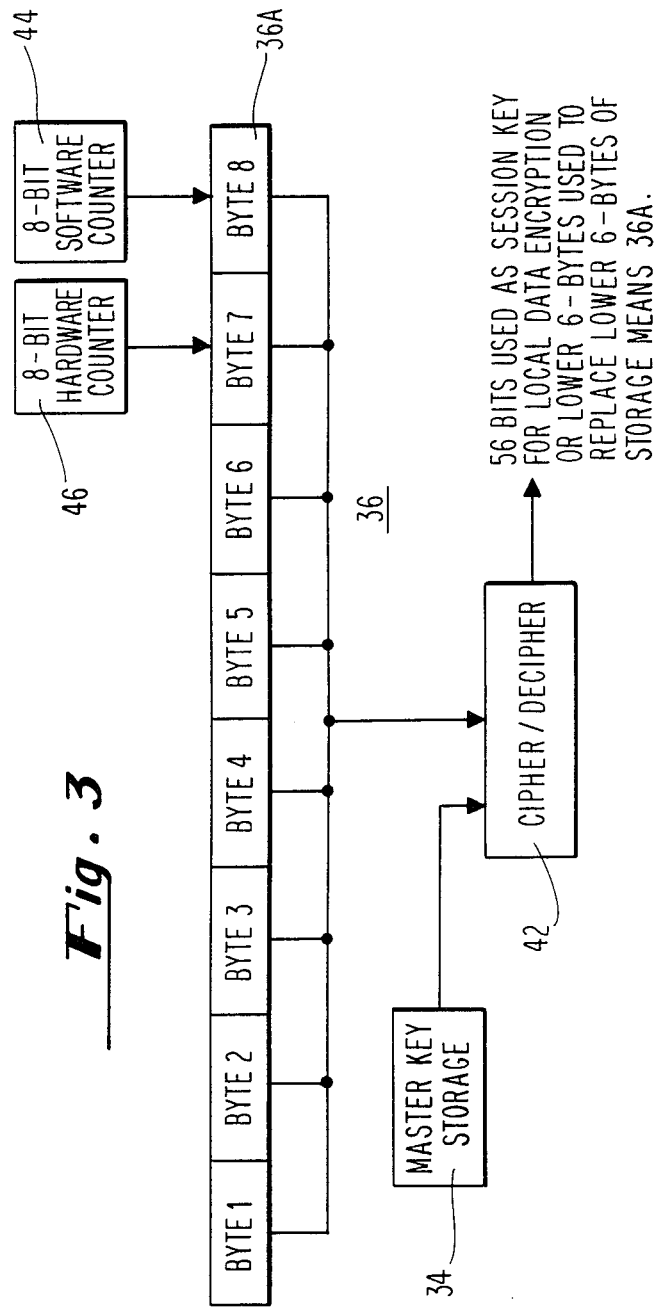
FIG. 3 is a block diagram of a session encryptor key generator useful in connection with the link encryptor/decryptor of FIG. 2.

Referring now to FIG. 3, the preferred embodiment of a session encryptor key generator 36 and the session encryptor storage means 38 will be described in detail, it being understood that session encoder key generator 37 and storage means 39 are of the same general type.

As shown in FIG. 3, the session encryptor key generator 36 employs an 8-byte storage means 36A, an 8-bit software counter 44, and an 8-bit hardware counter 46. Each of the counters 44 and 46 is a free running counter which produces an 8-bit binary seed number. The storage means 36A is preferably a 64-bit memory consisting of 8 bytes. The 8-bit binary number that constitutes byte 8 of the storage means 36A is derived from the value of the software counter 44. The 8-bit binary number that constitutes byte 7 of the storage means 36A is derived from the hardware counter 46. The 48-bit binary number that constitutes bytes 1-6 of the storage means 36A is derived from the lower six bytes of the result of a cryptographic transformation under the master key at the cipher/decipher means 42. This process cycles continuously until the instant in time when a first data character is received from the terminal 16 at the telecommunications link encryptor/decryptor 22. When that instant in time occurs, the specific value of the storage means 36A is transformed through the cipher/decipher means 42 one additional iteration and 56 bits of the result are used as the generated session key. In this manner, $2^{56}$ or $10^{17}$ different numbers can be produced by the session encryptor key generator and stored in the session encryptor key storage means 38.

Figure 4:
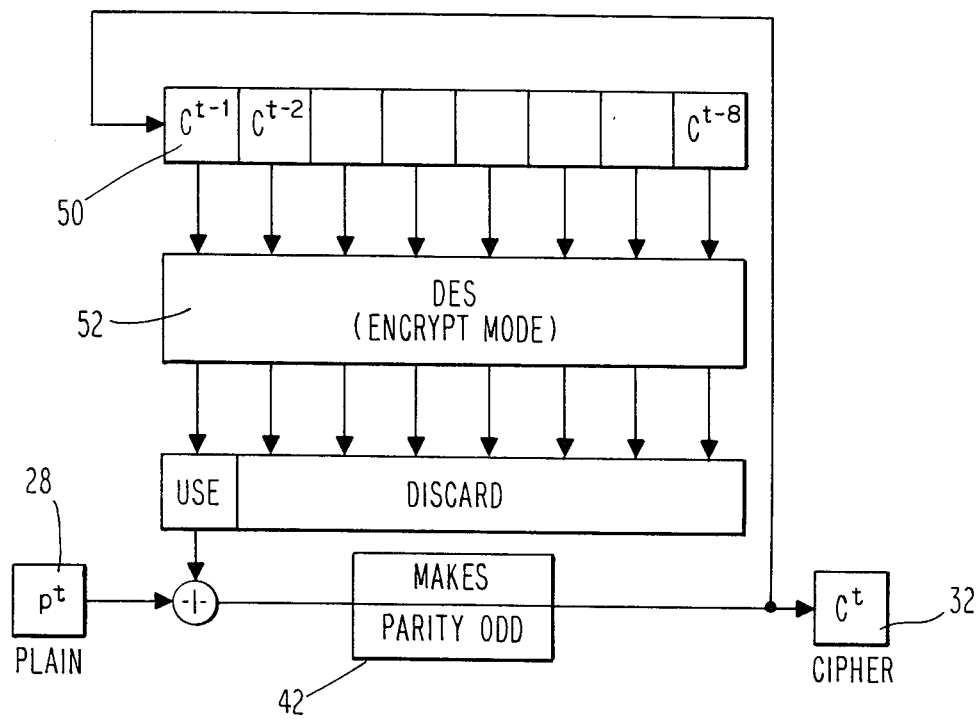
FIG. 4 is a block diagram of the cipher means utilized in connection with the link encryptor/decryptor shown in FIG. 2 operating in a cipher mode.
Figure 5:
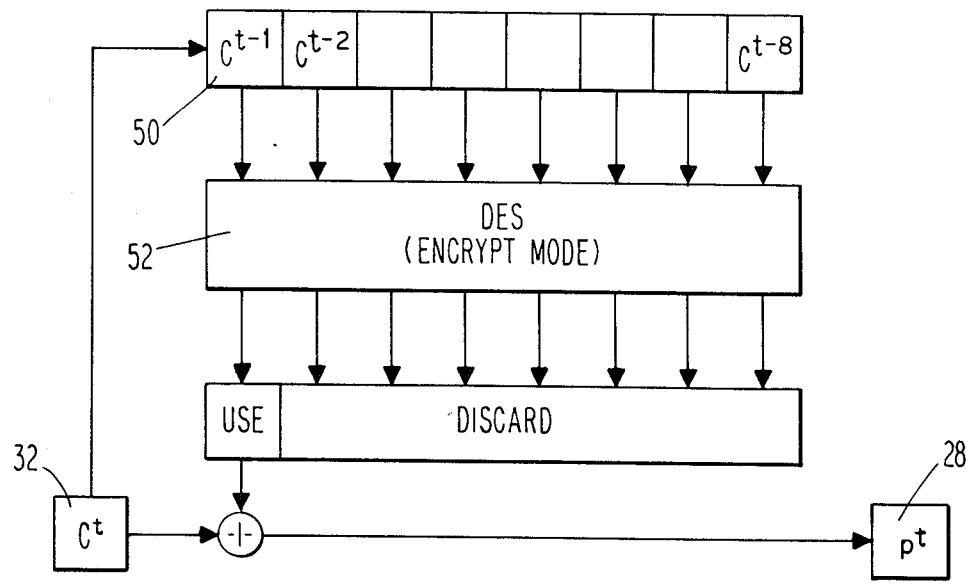
FIG. 5 is a block diagram of cipher means useful in connection with the link encryptor/decryptor of FIG. 2 operating in a decipher mode.

FIGS. 4 and 5 illustrate in detail cipher means 42 it being understood that the cipher means 43 is of the same general type.

As will be seen in connection with FIGS. 4 and 5, the cipher means 42, operates in a cipher feedback mode. In this mode, a session key is input to an 8-byte feedback buffer shown at 50. This key is directed to a microprocessor shown at 52 programmed in accordance with the data encryption standard algorithms referred to above. The microprocessor selects the most significant byte of the session key, the remaining seven bytes being discarded. This most significant byte is thereafter added Modulo-2 to plain text 28 input to the cipher means 42 to encipher the first eight bits of that text under the stored session key. The enciphered text is then made odd parity for transmission as cipher text 32 as shown. The contents of the cipher text are also shifted, one byte to the right and the most significant byte is replaced by the transmitted byte. Thus, in cipher feedback mode each transmitted byte of ciphered text is utilized in the encipherment of the next seven bytes of plain text.

As shown in FIG. 5, when operating in a decipher mode, an inverse function of that shown in FIG. 4 is utilized for decryption of transmitted bytes.

Although a particular embodiment of the invention has been shown and described in detail, it will be understood that various modifications will occur to those of ordinary skill in the art which fall within the true spirit and scope of the invention as set forth in the appended claims. For example, while the present invention has been described in connection with data transmissions between a terminal and host, those skilled in the art will readily appreciate that the telecommunication link encryptor/decryptor of the present invention are also applicable to data transmissions between terminals and between hosts as well.

I claim:

1. A telecommunication link encryptor/decryptor for data comprising:
    a first line for transceiving plain text and a second line for transceiving cipher text;
    a first means for storing a master key, said master key being utilized for encrypting session encryptor keys;
    a second means for storing a session encryptor key, said session encryptor key being utilized to encrypt data to be transmitted;
    a third means for storing a session decryptor key, said session decryptor key being utilized for decrypting data which has been received in cipher form, said session encryptor key differing from said session decryptor key; and
    cipher means connected to said first and said second lines and responsive to said second and third storing means for enciphering plain text under said session encryptor key for transmission on said second line and for deciphering cipher text under said session decryptor key for transmission on said first line.

2. The link encryptor/decryptor of claim 1 wherein:
    said cipher means is further responsive to said first means for storing and is selectively operative to encipher said session encryptor key and to decipher said session decryptor key under said master key for transmission on said second line.

3. The link encryptor/decryptor of claim 2 further comprising:
    a session encryptor key generator, said second means for storing being responsive thereto.

4. The link encryptor/decryptor of claim 3 wherein:
    said session encryptor key generator is responsive to said third means for storing, whereby said session encryptor key is automatically generated upon receipt of said session decryptor key.

5. The link encryptor/decryptor of claim 3 wherein said session encryptor key generator means comprises:
    a first eight-bit counter;
    a second eight-bit counter running at a different speed, and wherein said second means for storing comprises an eight-byte memory, each byte having eight bits, two bytes of which store the values contained in the first and second eight-byte counters and the remaining six bytes being derived from a cryptographic transformation under said master key.

6. The link encryptor/decryptor of claim 3 wherein said cipher means operates in a cipher feedback mode.

7. In a data communication network including a host interconnected to a facility at a remote location by a telecommunication link, a data security system comprising:
    a first link encryptor/decryptor connected between said facility and said link, said first encryptor/decryptor having:
        a first means for storing a master key, said master key being utiized for enciphering session encryptor/decryptor keys;
        a second means for storing a facility session encryptor key, said facility session encryptor key being utilized to encrypt data to be transmitted from said remote location;
        a third means for storing a facility session decryptor key, said facility session decryptor key being utilized for decrypting data received at said remote location, said facility session decryptor key differing from said facility session encryptor key; and cipher means responsive to said second and third storing means, said cipher means for enciphering plain text from said facility under said facility session encryptor key for transmission to said host and for deciphering cipher text from said host under said facility session decryptor key for transmission to said facility.

8. The system of claim 7 further comprising:

a second link encryptor/decryptor connected between said link and said host, said second encryptor/decryptor having:

a fourth means for storing said master key, said master key being utilized for enciphering session encryptor/decryptor keys;

a fifth means for storing said host session encryptor key, said host session encryptor key being utilized to encrypt data to be transmitted to said remote locations;

a sixth means for storing a host session decryptor key, said host session decryptor key differing from said host session encryptor key, but being the same as said facility session encryptor key, said host session decryptor key being utilized to decrypt data received from said remote location; and cipher means responsive to said fifth and sixth storing means, said cipher means being operative to decipher cipher text from said link under said host session decryptor key and to encipher plain text from said host under said host session encryptor key for transmission over said link.

9. The system of claim 8 wherein said host session encryptor key is the same as said facility session decryptor key.

10. The system of claim 9 wherein said facility is a data terminal.

11. The system of claim 9 wherein said facility is a computer.

12. A method for transmitting data in a secure manner between a terminal and a host comprising:

generating a terminal session encryptor key at said terminal;

encrypting said terminal session encryptor key under a master key;

transmitting said master key encrypted terminal session encryptor key to said host;

decrypting said master key encrypted terminal session encryptor key at said host to form a host session decryptor key;

automatically generating a host session encryptor key upon receipt of said master key encrypted terminal session encryptor key, said host session encryptor key being different from said terminal session encryptor key;

encrypting said host session encryptor key under said master key;

transmitting said master key encrypted host session encryptor key to said terminal;

decrypting said master key encrypted host session encryptor key at said terminal to form a terminal session decryptor key; and thereafter transmitting data from said terminal to said host under said terminal session encryptor key and from said host to said terminal under said host session encryptor key.

* * * * *